(No Model.)
W. WOODCOCK.
CAR WHEEL LATHE.
No. 316,427. Patented Apr. 21, 1885.
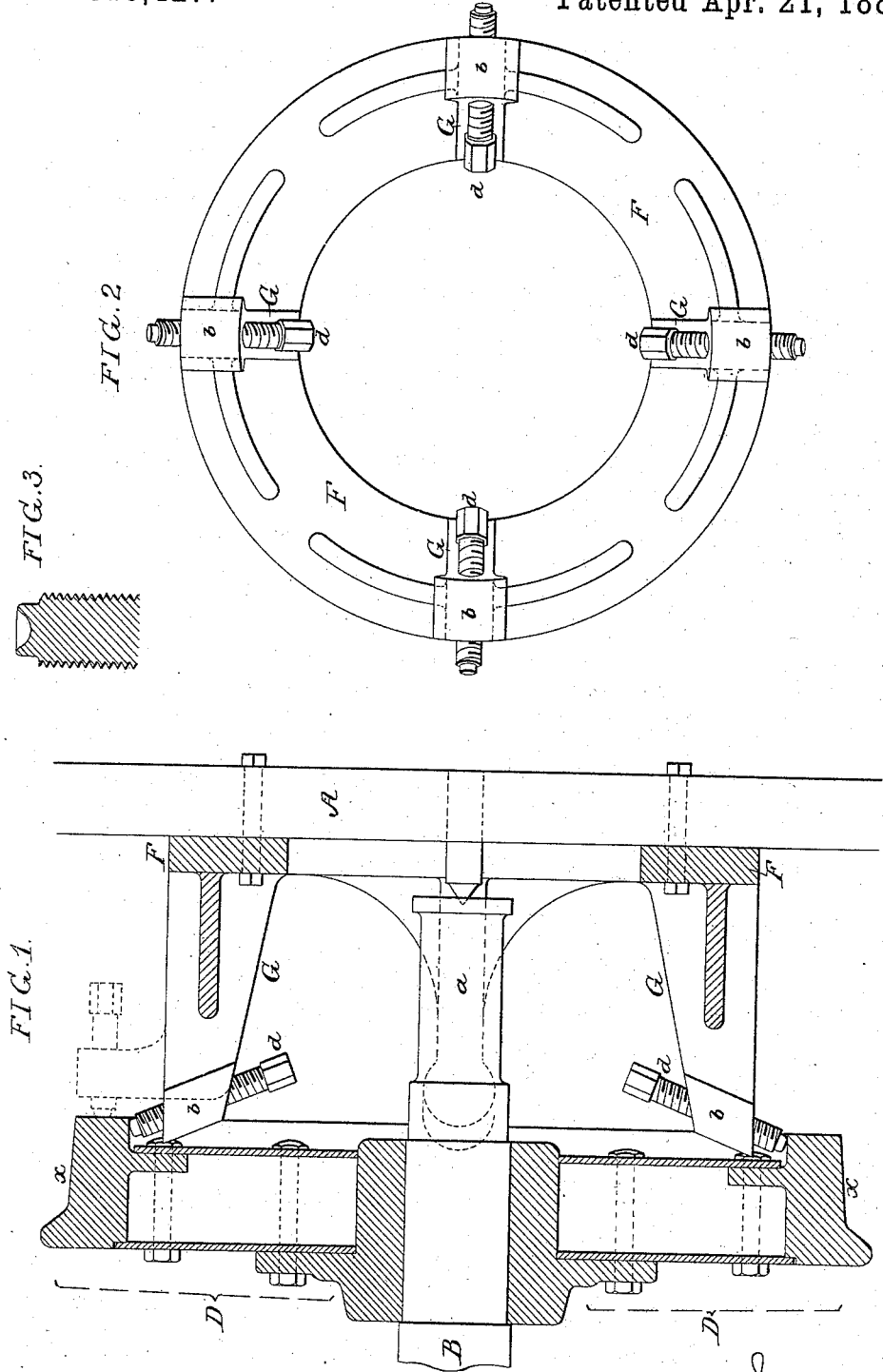
Witnesses:-
John E. Parker
James F. Tobin
Inventor
William Woodcock
by his Attorneys
Howson & Son

UNITED STATES PATENT OFFICE.

WILLIAM WOODCOCK, OF ELIZABETH, NEW JERSEY.

CAR-WHEEL LATHE.

SPECIFICATION forming part of Letters Patent No. 316,427, dated April 21, 1885.

Application filed December 15, 1884. (No model.)

*To all whom it may concern:*

Be it known that I, WILLIAM WOODCOCK, a citizen of the United States, and a resident of Elizabeth, Union county, New Jersey, have invented certain Improvements in Lathes for Turning Car-Wheels, of which the following is a specification.

The object of my invention is to provide an ordinary lathe for turning car-wheels with gripping devices so constructed that the rotation of the wheels will be effected by power applied more advantageously than usual. This object I attain in the following manner, reference being had to the accompanying drawings, in which—

Figure 1 is a view, partly in section and partly in elevation, showing part of a railway-car axle with one of its wheels and part of the face-plate of a lathe with my improved chucking attachment applied thereto; Fig. 2, a front view of this attachment, and Fig. 3 an enlarged view of part of one of the clamping-screws.

A is part of the face-plate of a lathe; B, part of a railway-car axle, and D one of the wheels secured thereto, this wheel in the present instance comprising a central hub, outer rim, and annular connecting-webs; but it should be understood that my invention is applicable to the turning of any of the usual forms of car-wheels.

When the power which rotates the wheel is applied to the projecting journal $a$ of the axle, the cutting-tool acting upon the tread $x$ of the wheel is at such a distance from the point to which the power is applied that an objectionable leverage is exerted, and there is a tendency to twist or strain the axle or loosen the wheel thereon. To overcome this objection, I grip the wheel at points adjacent to the tread, so that the power is applied to the wheel as near as possible to the point where the cut is being made. The device shown in Figs. 1 and 2 for the attainment of this purpose comprises a ring, F, securely bolted to the face-plate A of the lathe, and having a series of projecting arms or brackets, G,—four in the present instance—the outer ends of these brackets being provided with inclined bosses $b$, threaded for the reception of screws $d$, the outer ends of which, when the screws are projected, bear upon the inner side of the rim of the wheel and securely grip the same, the ends of the screws being preferably cupped, as shown in Fig. 3, so as to present sharp edges, which will bite into the metal of the wheel and insure a firm hold of the screws thereupon.

While this location of the screws is preferred, it is not essential to the proper carrying out of my invention, as the arms G may, if desired, be bent at the ends for the reception of set-screws, which engage with the outer side of the wheel-rim, as shown by dotted lines in Fig. 1; and instead of employing a ring with a series of arms or brackets the latter may be separate from each other and independently bolted to the face-plate A.

Special lathes have heretofore been devised for turning car-wheels, such lathes having clamping devices engaging with the flange of the wheel; but my invention is applied to an ordinary turning-lathe, the clamps engaging with the outer face of the wheel and being free from the tread or flange.

I claim as my invention—

1. The combination of the face-plate of a lathe with clamp-screws constructed to engage with the rim of a car-wheel, but free from the periphery thereof, as set forth.

2. The combination of the face-plate of the lathe with projecting arms having inclined bosses provided with set-screws adapted to engage with the inner face of the rim of a car-wheel, as specified.

3. The within-described attachment for car-wheel-turning lathes, the same consisting of a ring with a series of projecting arms or brackets carrying at the outer ends set-screws constructed to clamp the rim of a car-wheel, as specified.

In testimony whereof I have signed my name to this specification in the presence of two subscribing witnesses.

WM. WOODCOCK.

Witnesses:
ELIAS D. SMITH,
WILLIAM T. DAY.